United States Patent [19]

Wright

[11] Patent Number: 4,619,569

[45] Date of Patent: Oct. 28, 1986

[54] QUICK-RELEASE FASTENER WITH INTERMITTENT THREADS

[75] Inventor: Andrew C. W. Wright, Surrey, England

[73] Assignee: Dzus Fastener Co. Inc., West Islip, N.Y.

[21] Appl. No.: 564,242

[22] Filed: Dec. 21, 1983

[30] Foreign Application Priority Data

Jan. 11, 1983 [GB] United Kingdom ............... 8300669
Nov. 2, 1983 [EP] European Pat. Off. ......... 83306667.3

[51] Int. Cl.$^4$ ............................................. F16B 21/00
[52] U.S. Cl. ................................... 411/347; 411/417; 411/437
[58] Field of Search .............. 411/417, 418, 411, 349, 411/347, 549, 550, 551, 552, 553, 427, 437, 535, 544

[56] References Cited

U.S. PATENT DOCUMENTS 2,368,713  2/1945  Kane ................................... 411/552

FOREIGN PATENT DOCUMENTS

| 895999 | 11/1953 | Fed. Rep. of Germany | 411/349 |
| 861090 | 1/1941 | France | 411/553 |
| 867160 | 10/1941 | France | 411/553 |
| 1017604 | 12/1952 | France | 411/349 |
| 1155930 | 12/1957 | France | 411/417 |
| 2289794 | 10/1974 | France | 411/417 |
| 646611 | 11/1950 | United Kingdom | 411/417 |

Primary Examiner—Gary L. Smith
Assistant Examiner—Adrian H. Whitcomb, Jr.
Attorney, Agent, or Firm—Kane, Dalsimer, Kane, Sullivan and Kurucz

[57] ABSTRACT

A quick-release fastener comprises a threaded stud (11) and a complementarily threaded receptacle (1), the stud and receptacle each having one or more longitudinally extending threaded and unthreaded portions (15,8). The or each threaded portion (15,8) of the stud (11) and receptacle (1) respectively has a lesser angular width than the unthreaded portions of the receptacle and stud respectively. The fastener has at least one stop (9) at one edge of the or one of the threaded portions (8,15) on the stud or receptacle, whereby the stud can be inserted into the receptacle with the threaded (8,15) and unthreaded portions of the stud (11) and receptacle (1) respectively aligned and can thereafter be rotated to engage the respective threaded portions. The stop (9) prevents over-rotation of the stud (11) within the receptacle (1) thereby to define a fastened orientation of the stud within the receptacle.

11 Claims, 11 Drawing Figures

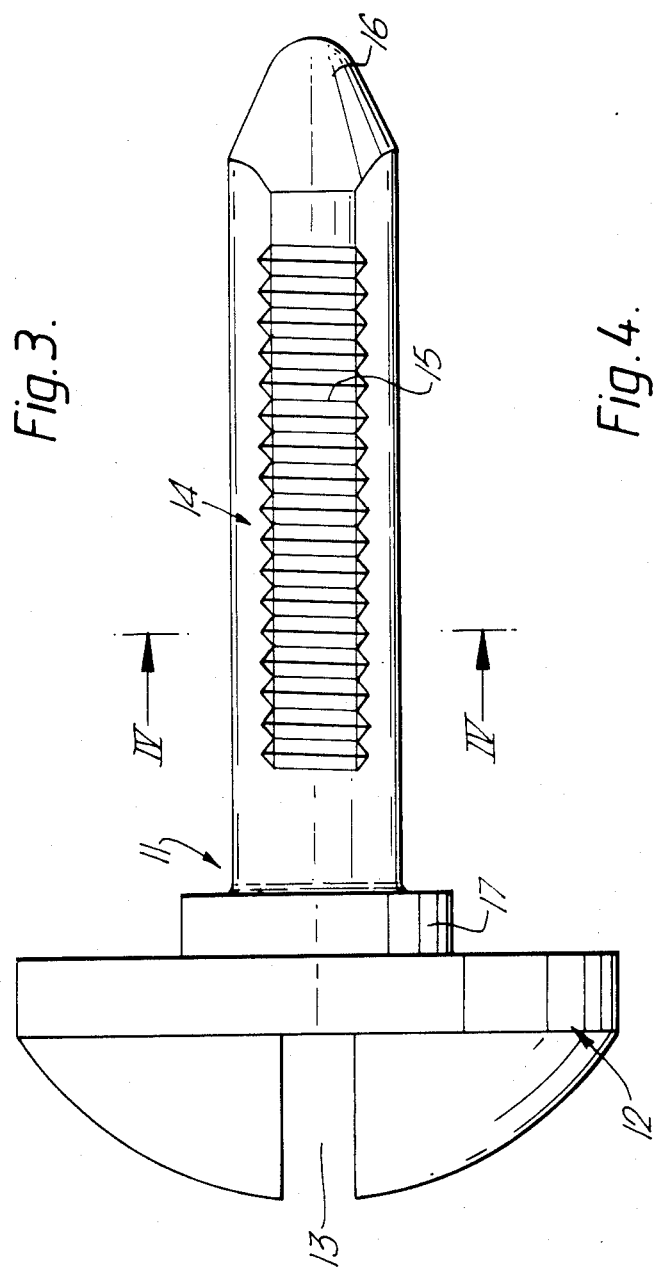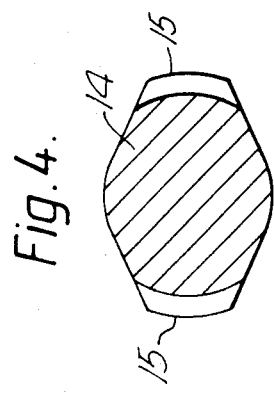

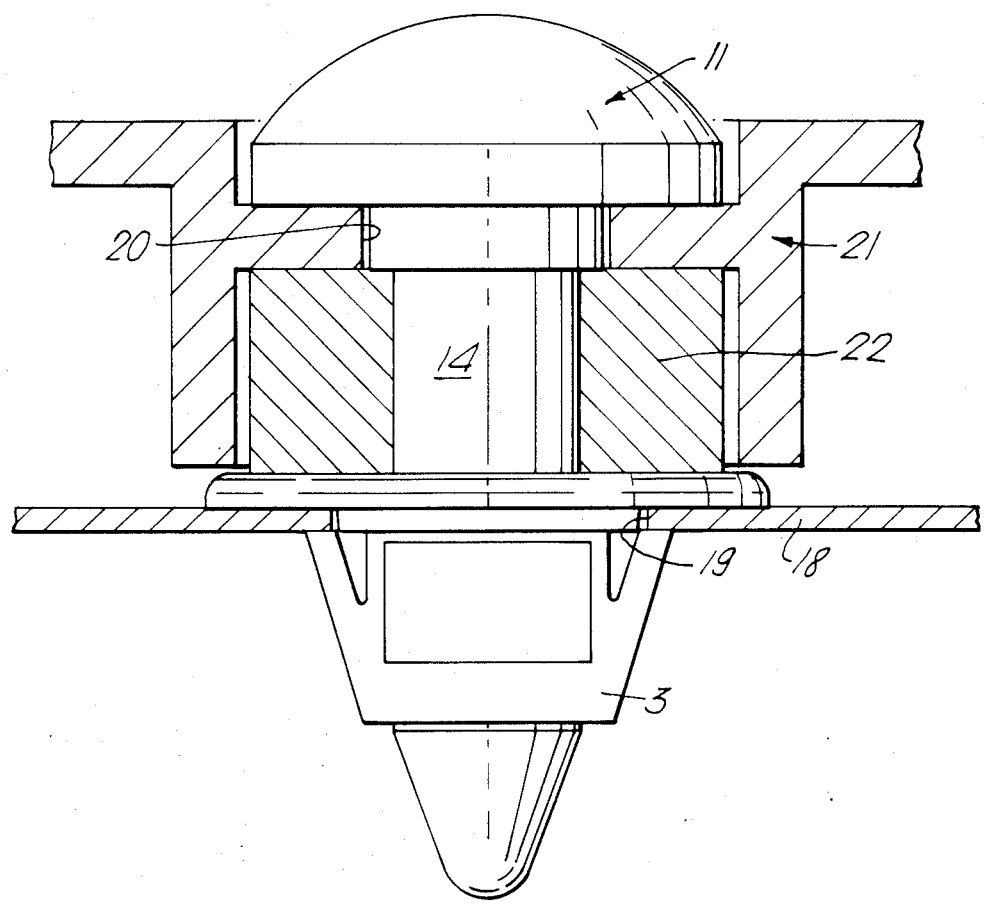

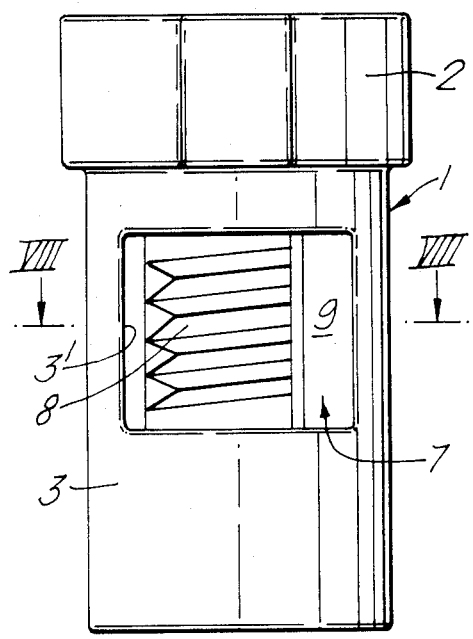
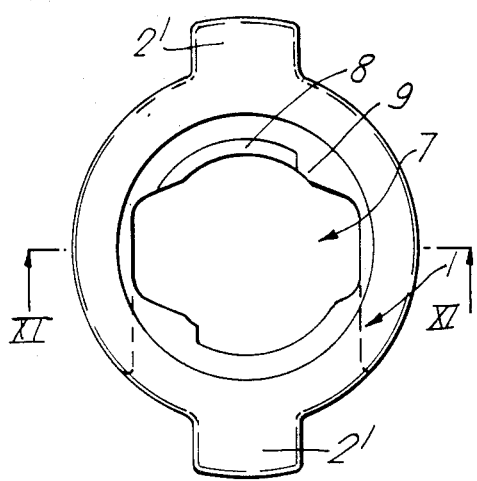
Fig.6.
Fig.7.
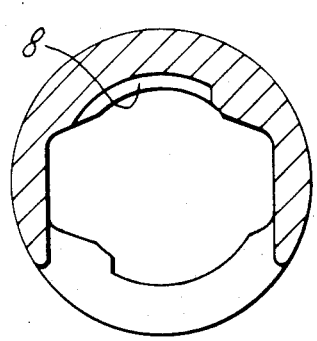
Fig.8.

QUICK-RELEASE FASTENER WITH INTERMITTENT THREADS

The present invention relates to a fastener comprising a threaded stud and complementarily threaded receptacle. More particularly the invention relates to a so-called "quick-release fastener".

A conventional screw-threaded bolt which cooperates with a screw-threaded nut or socket is a common means of fastening together a pair of members or panels. However, particularly where a single fastener is designed to be used on a range of members of different thicknesses or different spacings apart, the bolt of such a fastener may have to be considerably longer than is usually necessary, in order to accommodate the range of thicknesses or spacings and provide secure engagement between the bolt and the screw-threaded socket. This means that on insertion of the bolt into the socket the bolt may have to be rotatated a considerable number of turns in order for the panels to be tightly engaged or properly spaced, especially when the members are relatively thin or closely spaced.

Quick-release fasteners which often require a simple quarter-turn of a stud part of the fastener after initial location within a complementary receptacle, are also well known, but generally provide for only one fixing position and are thus not capable of accommodating a wide range of member thicknesses or spacings apart.

In order to overcome these problems threaded fasteners (see FR-A-No. 2,289,794) have been proposed in which the stud and receptacle each have longitudinally extending unthreaded portions so that the stud can be inserted initially axially into the receptacle, with the respective threaded and unthreaded portions of the stud and receptacle aligned, and thereafter rotated to engage the respective threaded portions to complete the fastening. This avoids the need to screw-in the stud over the whole of its length.

FR-A-No. 1,017,604, describes a similarly constructed quick-release mechanism on a vice. In addition, however, the bolt of this mechanism is prevented from over-rotation by shoulders formed at one end of the bore of the housing into which the bolt is received. Whilst this is an acceptable way of preventing over-rotation (which would cause disengagement of the respective threaded portions) in the vice mechanism shown in FR-A-No. 1,017,604, space considerations dictate that a different solution is preferable with quick-release fasteners where the threaded portions of the two parts of the fastener are considerably smaller.

According to the present invention therefore a quick-release fastener comprises a threaded stud and a complementarily threaded receptacle, the stud and receptacle each having one or more longitudinally extending unthreaded portions, the threaded portions of the stud and receptacle respectively having a lesser angular width than the unthreaded portions of the receptacle and stud respectively and the receptacle or stud having at least one stop at one edge of one of the unthreaded portions on the receptacle or stud, whereby the stud can be inserted into the receptacle axially with the threaded and unthreaded portions of the stud and receptacle respectively aligned and can thereafter be rotated to engage the respective threaded portions, the stop preventing over-rotation of the stud within the receptacle thereby to define a fastened position of the stud within the receptacle.

In this specification the term "threaded" is intended to cover not only helically formed screw-threaded forms, but also forms which comprise a series of concentric grooves or ribs thus having a zero helix angle.

Preferably, the stop (or each stop) comprises a longitudinally extending rib or shoulder at the junction between respective threaded and unthreaded portions of the receptacle. When the stud and receptacle have conventional helical thread forms the stop (or each stop) may be formed at the leading edge of the threaded portion (or each threaded portion) when viewed from the end into which the stud is to be inserted. By this means, when, for example, the helical threaded forms on the stud and receptacle are left-hand threads, the stud can be axially inserted into the receptacle and thereafter rotated in clockwise direction, that is to say in what would be the normal direction of tightening with a right-hand thread, through a quarter of a turn, until the threads on the stud engage with the stop (or each stop) on the receptacle. Thus, the parts are fastened by a rotation in a direction which would normally unthread the parts, but the stop prevents over-rotation and holds the respective threaded parts in secure engagement over substantially their whole length. By providing resilience between the stud and receptacle, for example, by means of an elastomeric O-ring inserted underneath the head of the stud between the underside of the head of the stud and the panel to which it is attached, or, alternatively for example, between the two members which are to be engaged by means of the fastener, the receptacle parts can be biased into the fastened position, the resilience as well as the inevitable friction between the threaded portions needing to be overcome before the stud can be released from the receptacle.

Where the threaded portions of the stud and receptacle comprise portions of concentrically formed grooves or ribs rather than a true helical thread then the engagement between the threaded portions on the stud and receptacle may be arranged as a friction fit to reduce the possibility of accidental rotation of the stud in the unlocking direction to release the threaded portions from engagement with one another.

Preferably, the receptacle is formed with a single threaded portion and the stud is formed with a pair of complementary threaded portions.

Two examples of fasteners constructed in accordance with the present invention will now be described with reference to the accompanying drawings in which:

FIG. 3 is a side elevation of a stud for engagement with the receptacle shown in FIGS. 1 and 2;

FIG. 4 is a cross-section on the lines IV—IV in FIG. 3;

FIG. 5 is a view of the first fastener shown in an assembled condition;

FIG. 6 is a side elevation of the receptacle of a second fastener;

FIG. 7 is a plan view of the receptacle of FIG. 6;

FIG. 8 is a section on VIII—VIII in FIG. 6;

Figure 1:
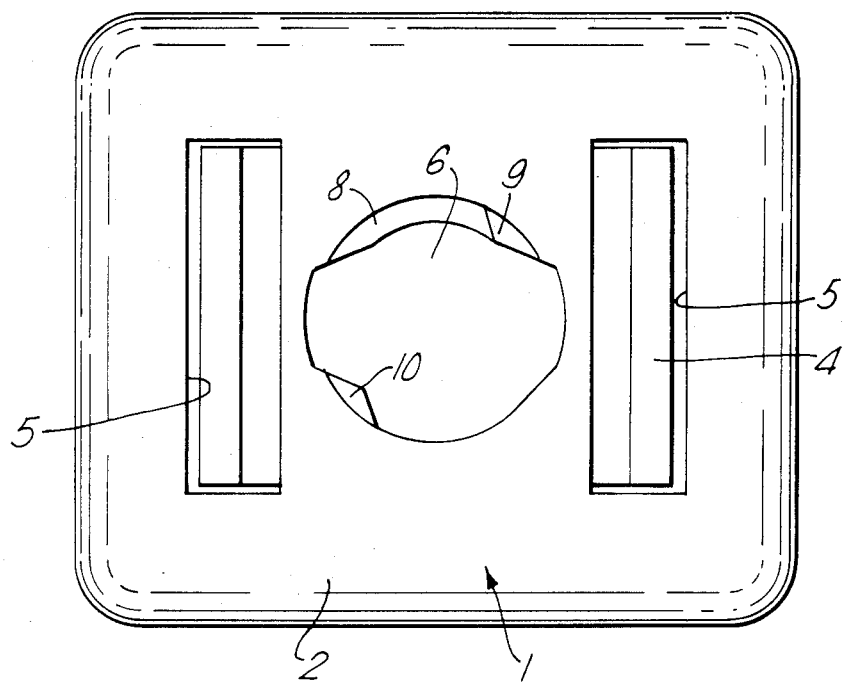
FIG. 1 is a plan view of the receptacle of the first fastener.

The first fastener shown in FIGS. 1 through 5 is formed of plastics material. The receptacle 1 has a head 2 and a body part 3, the body part 3 having a pair of flanges 4 which diverge outwardly towards the underside of the head 2. As the fastener is formed of a resilient plastics material, these flanges 4 enable the receptacle to be snap-fitted into an aperture in a member (see FIG. 5) from the front of the member, the flanges 4 engaging the rear of the member and the head 2 engaging the front face of the member. The head 2 has a pair of slots 5 formed by a mould part which simplifies the moulding operation of the flanges 4. In addition, the head 2 has an irregularly shaped aperture 6 which communicates with a bore 7 formed in the body part 3.

The body part 3 has an open side (the side seen in FIG. 2) and the bore 7 has a screw-threaded portion 8 formed on the opposite side on the opening in the body part 3. The opening enables the screw threaded portion 8 to be formed by a core part in a mould.

Figure 2:
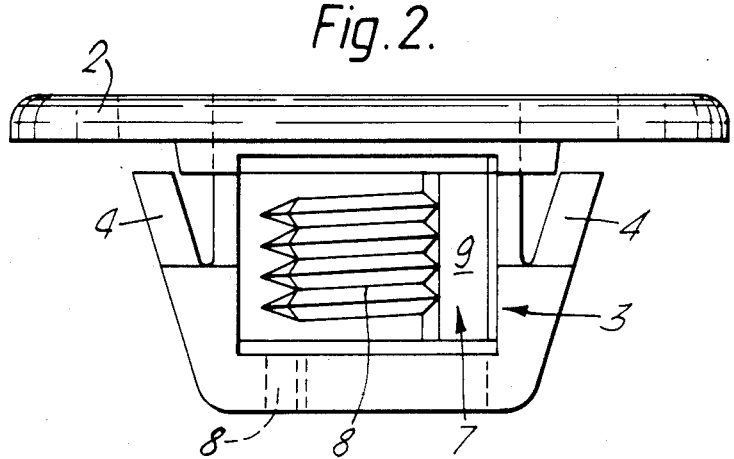
FIG. 2 is a side elevation of the receptacle shown in FIG. 1.
Figure 9:
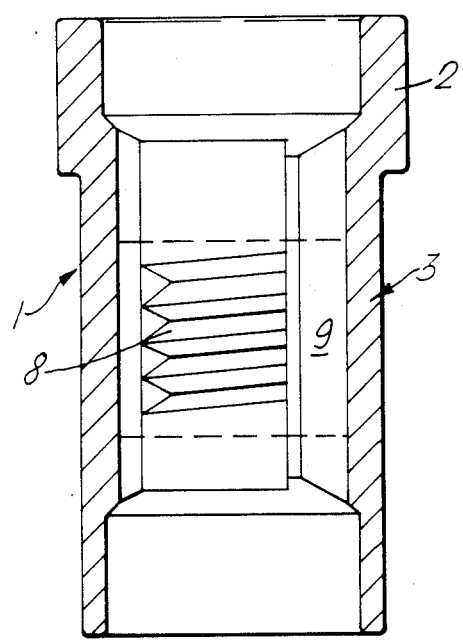
FIG. 9 is an axial section through the receptacle shown in FIG. 6.
Figure 10:
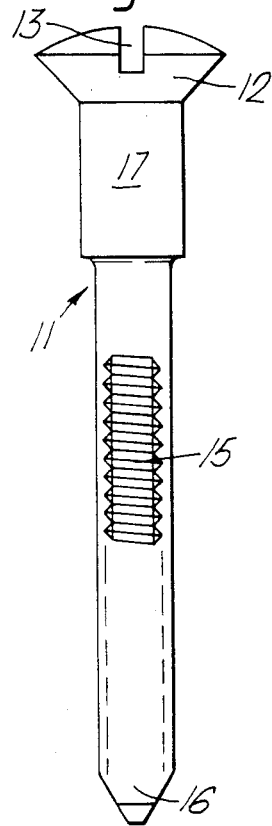
FIG. 10 is a side elevation of a stud for engagement with the receptacle shown in FIGS. 6 to 9.

It will be appreciated from FIGS. 1 and 2 that the threaded portion 8 comprises a portion of a left-hand screw-thread. At one edge of the screw-threaded portion 8 a longitudinal rib 9 is formed over the length of the bore 7, corresponding abutments 10 being formed diametrically opposite the shoulder 9 at the opening in the head 2 and at the opposite end of the body portion 3.

The stud 11 has a head 12 with a conventional screwdriver slot 13 and a shank 14 which has a pair of diametrically opposed threaded portions 15, again the threaded portions being portions of a left-hand screwthread. The end of the shank remote from the head 12 has a curved tapered nose 16 and on the underside of the head 12 the shank 14 has an enlarged diameter portion 17.

The method of use of the fastener shown in FIGS. 1 through 4 is shown in FIG. 5, the receptacle 1 being held in an aperture 19 in a support 18, and the stud 11 being mounted in an aperture 20 in a panel 21. The stud 11 is held on the panel 21 by a thick rubber washer 22 which surrounds the upper part of the shank 14 of the stud. To attach the panel 21 to the member 18 the stud 11 is inserted axially into the receptacle 3, with the threaded portion 8 in the receptacle 3 being aligned with one of the unthreaded side portions on the stud 11, until the stud cannot be pushed in any further. Thereafter, the stud is turned in a clockwise direction (that is to say the normal direction of rotation of a right-handed screw-thread) so that one of the threaded portions 15 on the stud 11 engages with the screw-threaded portion 8. The stud is rotated through substantially a quarter of a turn until the edge of the threaded portion 15 abuts against the shoulder 9, the stud thus being rotated into the fastened position in what would normally be the direction of unthreading of the threaded portions on the stud and receptacle, but the shoulder 9 preventing over-rotation to a position in which the the threaded portions of the stud and receptacle become disengaged again. The stud is thus moved partially axially outwards as the thread forms move on one another, the rubber washer 22 providing a biasing force preventing accidental rotation of the stud in the anti-clockwise or unlocking direction.

The fastener shown in FIGS. 6 through 11 has a die cast receptacle and a conventional metal stud. Parts of the second fastener which are substantially similar to previous described parts of the first fastener shown in FIGS. 1 through 5 have a corresponding reference numeral.

The receptacle of the second fastener is intended for permanent fixing in, for example, a moulded component (see FIG. 11), protruding ears 2' serving in use to locate the receptacle against rotation in the component. Again, the receptacle 1 is formed with but a single threaded portion 8, formed by means of a mould core part entering through an aperture 3' in the side of the body part 3.

The stud 11 has a conventionally shaped head 12 for receipt in a countersunk bore and a screwdriver slot 13. The shank 14 has an elongate enlarged diameter portion 17, diametrically opposed left-hand screw-threaded portions 15 and a tapered nose 16.

Figure 11:
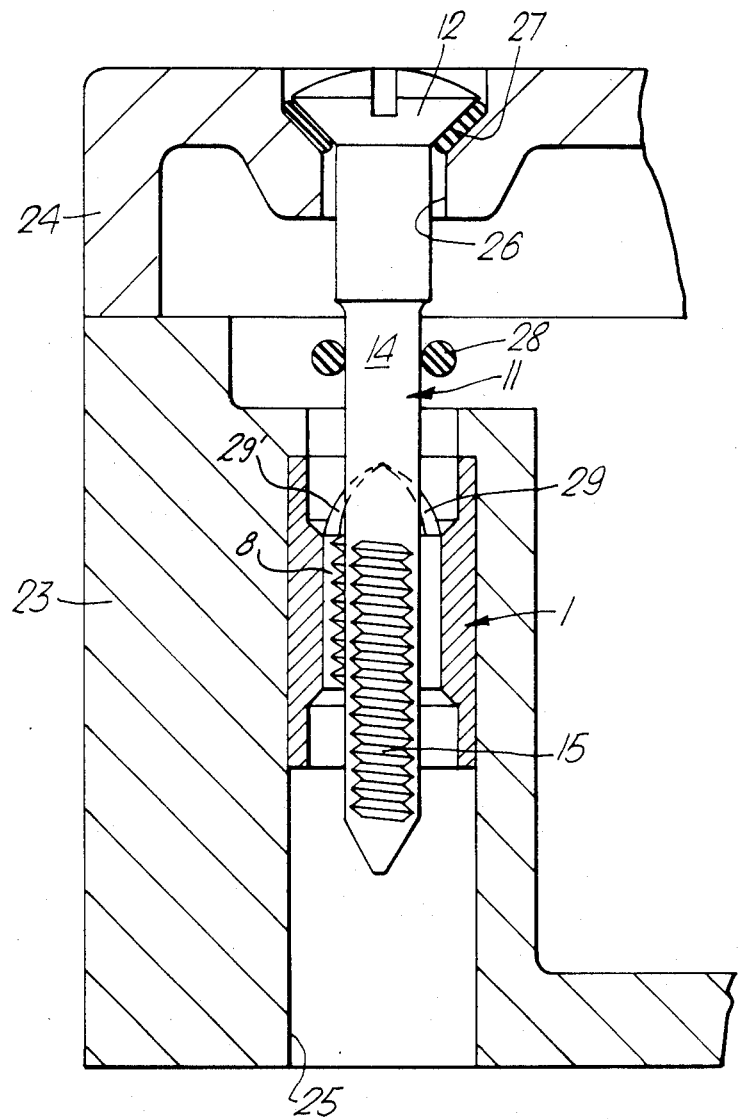
FIG. 11 shows a section on XI—XI in FIG. 7 of the second fastener in an assembled condition.

FIG. 11 shows a pair of moulded plastics components 23, 24. The component 23 has a bore 25 in which the receptacle 1 of the second fastener is permanently fixed, for example, during the moulding of the component 23 or at a later date by any conventional known technique, and the stud 11 is located in an aperture 26 in the component 24 which may, for example, be a cover member for the component 23. On the underside of the head 12 of the stud 11 in a compliant O-ring 27 is provided, a further O-ring 28 being located on the shank 14 to prevent accidental removal of the stud 11 from the component 24. The stud 11 is fastened into the receptacle 1 in the same way as with the first fastener, but the outwardly biasing force is in this case provided by the O-ring 27 between the underside of the head 12 and the component 24. FIG. 11 also shows a minor modification of the receptacle 1, in the form of a pair of helical cam surfaces 29, 29' which serve to pre-orientate the stud 11 as it is inserted into the receptacle 1 so that neither of the threaded portions 15 is in alignment with the threaded portion 8 in the receptacle, thereby ensuring smooth axial insertion of the stud 11 into the receptacle 1 prior to rotation into the fastened position. As the stud 11 is inserted into the receptacle 1, its tapered nose is engaged by either camming surface 29 turning the stud 11 clockwise, or camming surface 29' turning stud 11 counterclockwise (depending on the initial orientation of the stud) until stud threaded positions 15 clears the receptacle threaded portions 8.

It is envisaged that the fastener described above could be used in assembling electrical outlet boxes or switches since the cover/socket/switch could be assembled loosely in position with a small clearance between it and the support, the wires then being arranged neatly with all the studs aligned and rotated into a fastened position in their respective receptacles, whereby after checking of the wire positions, the studs could be quarter-turned to unlock, the cover pressed home and the stud then re-tightened. The depth tolerance provided by these fasteners can accommodate wide variations in support thickness due to changes in plaster work or adjacent decor for example.

Although the receptacles described above have a one-part form, other constructions are possible within the scope of the invention. The receptacle may comprise two identical halves which are positioned together to form the complete receptacle, or a one-piece moulding or casting, a central portion of which comprises a hinge joining together identical halves of the moulding which can thus be bent about the hinge and engaged with one another.

I claim:

1. A quick-release fastener comprising a threaded stud and a complementarily threaded receptacle, said stud and said receptacle each having at least one longitudinally extending threaded portion and at least one longitudinally extending unthreaded portion, said at least one threaded portion of said stud and said receptacle respectively having a lesser angular width than said at least one unthreaded portion of said receptacle and said stud respectively, said fastener including at least one longitudinal rib which runs along the length of said at least one threaded portion, whereby said stud can be inserted into said receptacle with said threaded and unthreaded portions of said stud and receptacle respectively aligned and can thereafter be rotated to engage said respective threaded portions, said stop preventing over rotation of said stud within said receptacle thereby to define a fastened orientation of said stud within said receptacle.

2. A fastener according to claim 1, wherein said longitudinal rib is disposed at the junction between respective threaded and unthreaded portions of said receptacle.

3. A fastener according to claim 1, wherein said threaded portions of said stud and said receptacle have helical thread forms, said longitudinal rib being formed at the leading edge of the respective threaded portion.

4. A fastener according to claim 3, wherein at least one of the thread forms on said stud and on said receptacle is a left-handed thread form.

5. A fastener according to any of claims 1 to 3, wherein said at least one longitudinally extending threaded portion of said receptacle and stud each comprise portions of a series of concentric grooves and ribs.

6. A fastener according to claim 1, wherein said stud includes a head, and a resilient O-ring is located around said shank of said stud underneath said head.

7. A fastener according to claim 1, wherein said receptacle comprises a one-piece moulding.

8. A fastener according to claim 1, including a plurality of threaded and unthreaded portions on said stud and said receptacle.

9. A fastener according to claim 1, wherein said receptacle includes a pair of helical cam forms at said end into which said stud is inserted in use, said cam forms co-operating with said end of said stud to rotate said stud into a position in which said at least one threaded portion is aligned with said respective at least one unthreaded portion.

10. A fastener according to claim 1, wherein said end of said stud which is inserted into said receptacle is tapered.

11. A receptacle, for a quick-release fastener, said receptacle having at least one longitudinally extending threaded portion and at least one longitudinally extending unthreaded portion, said at least one threaded portion having a lesser angular width than said at least one unthreaded portion, said receptacle including at least one stop at one edge of said at least one threaded portion, whereby a corresponding stud can be inserted into said receptacle with said threaded and unthreaded portions of said stud and receptacle respectively aligned and can thereafter be rotated to engage said respective threaded portions, said stop preventing over rotation of said stud within said receptacle thereby to define a fastened orientation of said stud within said receptacle.

* * * * *